(12) United States Patent
Perakes et al.

(10) Patent No.: US 12,365,230 B2
(45) Date of Patent: Jul. 22, 2025

(54) ELECTRIC AXLE WITH COMPACT ELECTRIC MACHINE AND GEARBOX ARRANGEMENT

(71) Applicant: Dana Automotive Systems Group, LLC, Maumee, OH (US)

(72) Inventors: Andy Perakes, Canton, MI (US); Eric M. Engerman, Plymouth, MI (US); Ryan D. Nelms, Weatherford, TX (US); Rick C. Sigmon, Bowling Green, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 224 days.

(21) Appl. No.: 18/173,660

(22) Filed: Feb. 23, 2023

(65) Prior Publication Data

US 2023/0294503 A1   Sep. 21, 2023

Related U.S. Application Data

(60) Provisional application No. 63/269,388, filed on Mar. 15, 2022.

(51) Int. Cl.
| | |
|---|---|
| *B60K 1/02* | (2006.01) |
| *B60K 6/26* | (2007.10) |
| *B60K 6/365* | (2007.10) |
| *B60K 6/405* | (2007.10) |
| *B60K 17/04* | (2006.01) |
| *F16H 57/02* | (2012.01) |

(52) U.S. Cl.
CPC ............... *B60K 6/365* (2013.01); *B60K 1/02* (2013.01); *B60K 6/26* (2013.01); *B60K 6/405* (2013.01); *B60K 17/04* (2013.01); *F16H 57/02* (2013.01); *B60Y 2200/92* (2013.01); *F16H 2057/02034* (2013.01); *F16H 2057/02052* (2013.01)

(58) Field of Classification Search
CPC .......... B60K 17/046; B60K 1/02; B60K 6/40; B60K 6/405; B60K 17/12; F16H 2200/2007; F16H 2200/2097; F16H 3/62–666
See application file for complete search history.

(56) References Cited

U.S. PATENT DOCUMENTS

| | | | |
|---|---|---|---|
| 9,630,482 B2* | 4/2017 | Raymond | B60K 1/02 |
| 11,505,061 B2* | 11/2022 | Mepham | B60B 35/16 |
| 2018/0145557 A1* | 5/2018 | Hornischer | B60K 7/0007 |
| 2018/0298994 A1* | 10/2018 | Lian | B60K 6/387 |
| 2018/0339695 A1* | 11/2018 | Kawahara | B60K 17/165 |
| 2020/0276895 A1* | 9/2020 | Mepham | B60K 17/046 |
| 2023/0327514 A1* | 10/2023 | Reimnitz | H02K 21/12 |
| | | | 310/90 |
| 2024/0131923 A1* | 4/2024 | Sigmon | B60K 17/145 |

\* cited by examiner

*Primary Examiner* — Ernesto A Suarez
*Assistant Examiner* — Lillian T Nguyen
(74) *Attorney, Agent, or Firm* — McCoy Russell LLP (57) ABSTRACT

An electric axle is provided. The electric axle includes, in one example, a first electric machine directly coupled to a first planetary gear set, a second electric machine directly coupled to a second planetary gear set and a housing. The housing includes a first section that encloses the first electric machine and the first planetary gear set, a second section that encloses the second electric machine and the second planetary gear set, and a decreased diameter section that extends between the first section and the second section.

17 Claims, 4 Drawing Sheets

ELECTRIC AXLE WITH COMPACT ELECTRIC MACHINE AND GEARBOX ARRANGEMENT

CROSS REFERENCE TO RELATED APPLICATION

The present application claims priority to U.S. Provisional Application No. 63/269,388, entitled "ELECTRIC AXLE WITH COMPACT ELECTRIC MACHINE AND GEARBOX ARRANGEMENT," and filed on Mar. 15, 2022. The entire contents of the above-listed application are hereby incorporated by reference for all purposes.

TECHNICAL FIELD

The present disclosure relates to an electric axle that includes multiple electric machines and gearboxes with a space efficient architecture.

BACKGROUND AND SUMMARY

Segments of the vehicle market are moving towards electrification. However, the inventors have recognized that vehicle platform electrification presents investment costs and project management complexity which create challenges for automotive manufacturers and suppliers. Attempts have been made to manage this complexity by carrying over certain features of existing vehicle platforms when electrifying the platforms. The inventors have recognized that the carry-over of these components may create packaging challenges. Specifically, features of certain hybrid powertrains and their internal combustion engine counterparts may impose space constraints on electric axles such as electrified rigid beam axles.

The inventors have recognized the abovementioned challenges and developed an electric axle (e.g., an electric beam axle) to at least partially overcome the challenges. The electric axle includes, in one example, a first electric machine directly coupled to a first planetary gear set, a second electric machine directly coupled to a second planetary gear set, and a housing. The housing includes a first section that encloses the first electric machine and the first planetary gear set, a second section that encloses the second electric machine and the second planetary gear set, and a decreased diameter section that extends between the first section and the second section. In this way, electric axle is constructed in a space efficient package that achieves performance targets. The first and second electric machines may be axial flux motor-generators to further increase the axle's space efficiency and specifically decrease the axle's lateral width (e.g., as measured along its axis of rotation) when compared to other motors, such as radial flux motors.

Further, in one example, in each of the first and second planetary gear sets, a sun gear may be directly coupled to the respective electric machine and a carrier may be directly coupled to a drive wheel. In such an example, the first and second planetary gear sets each include planet gears that are axially offset from a sun gear. Using planetary gear sets with this arrangement allows the electric axle to achieve a desired space efficiency, specifically with regard to the axle's axial length. Further in one example, the electric axle may be incorporated into a support structure. This support structure may further be profiled to mate with a portion of an engine such as a lubricant pan and/or a transmission, in a hybrid powertrain embodiment. The use of the support structure increases the assembly's adaptability with regard to powertrain configuration. Consequently, manufacturing efficiency of powertrains using the abovementioned electric axle is increased, thereby increasing customer appeal.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A vehicle including a powertrain with a space efficient electric axle profiled to be incorporated into a support structure that achieves targeted performance characteristics is described herein. The electric axle is profiled to be incorporated into the support structure which wraps around other powertrain components (e.g., hybrid powertrain components) such as an engine (e.g., transversely mounted engine) and transmission, if desired. As such, the support structure and electric axle assembly is adapted for use in a wider variety of vehicle platforms, thereby increasing customer appeal and allowing the assembly to leverage economies of scale cost efficiencies in relation to manufacturing. The electric axle may have an axial length that enables the incorporation of the axle in a recess between axially opposing protrusions that form sides of the support structure (e.g., cradle). Axial flux electric motors may be used in the electric axle in conjunction with simple or multi-stage planetary gear sets to meet the packaging demands of the support structure particularly with regard to the axle's lateral width. The multi-stage planetary gear sets may include a first and second set of planetary gears attached to different axial positions on the carrier with one of the sets of planet gear that mesh with a grounded ring gear. In such an arrangement, sun gears in the planetary may be coupled (e.g., directly coupled) to the electric motors and the carrier may be coupled (e.g., directly coupled) to the drive wheels. In this way, the gearboxes can achieve gear ratio range targets in a compact package, if so desired.

Figure 1:
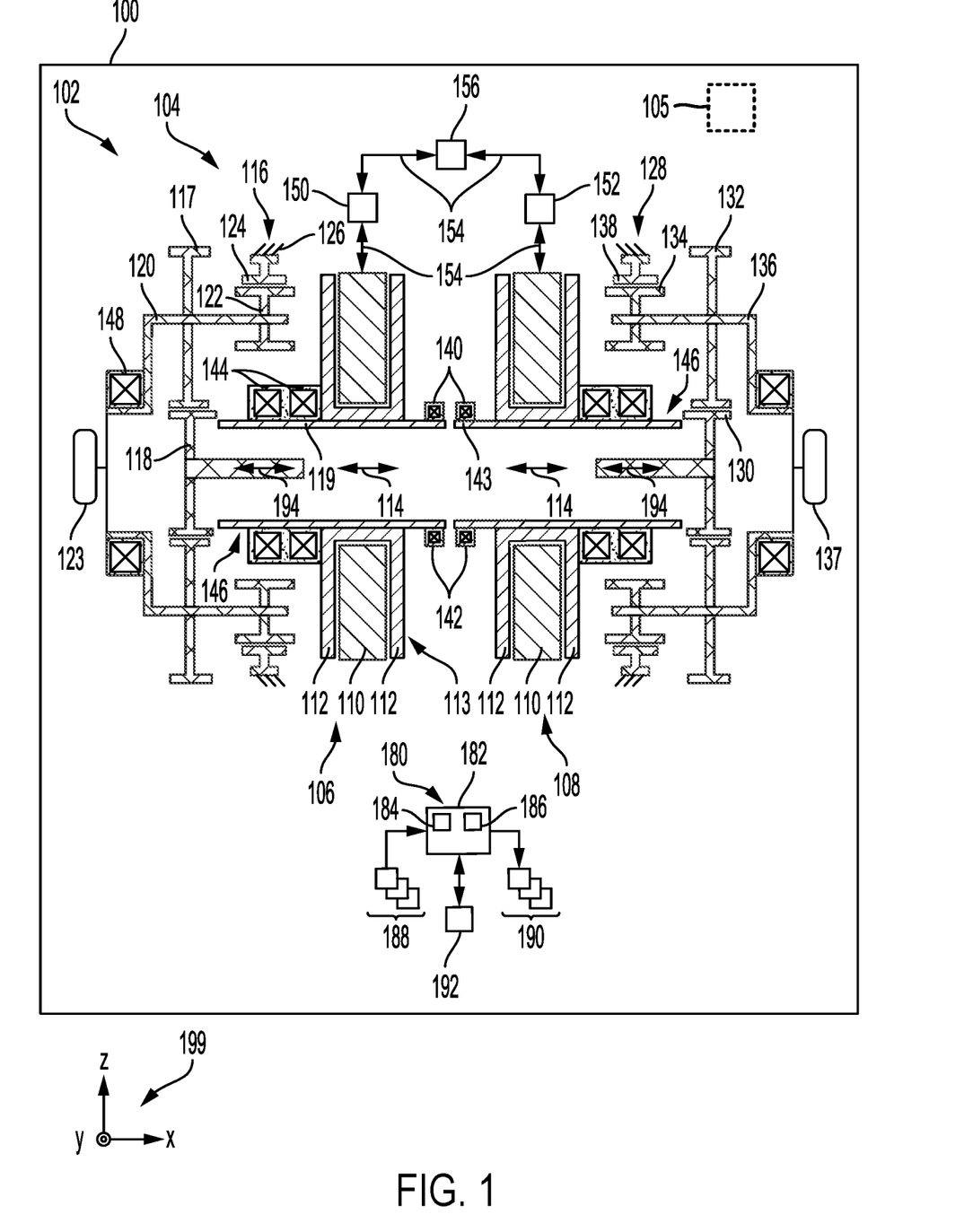
FIG. 1 shows a schematic representation of a vehicle with a first example of an electric axle.
Figure 2:
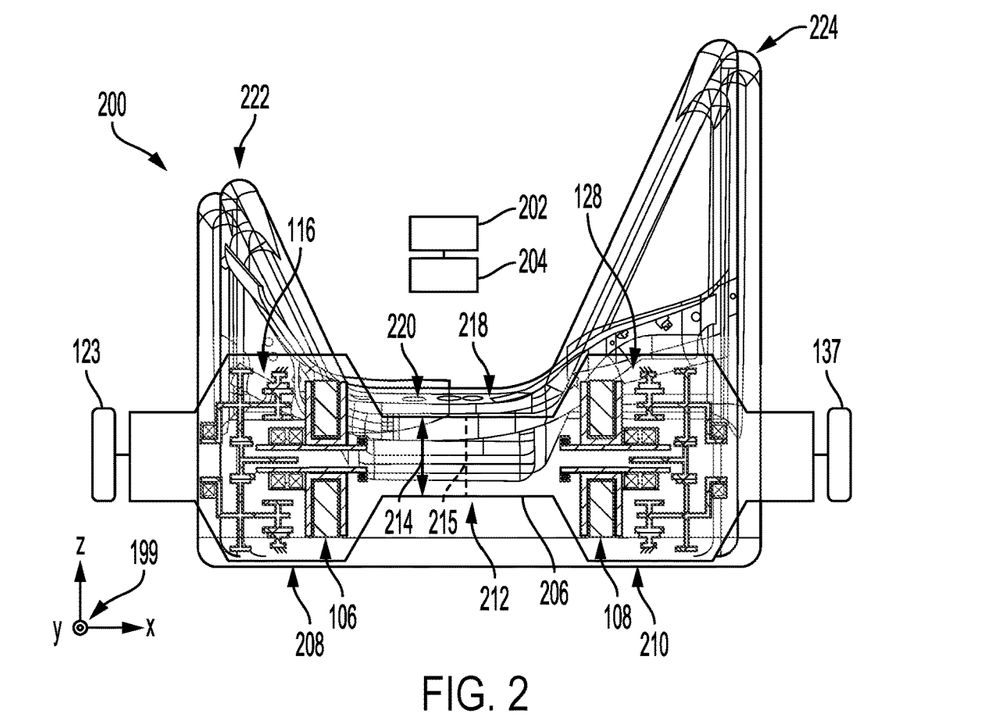
FIG. 2 shows an illustration of the electric axle, depicted in FIG. 1, incorporated into a support structure.
Figure 3:
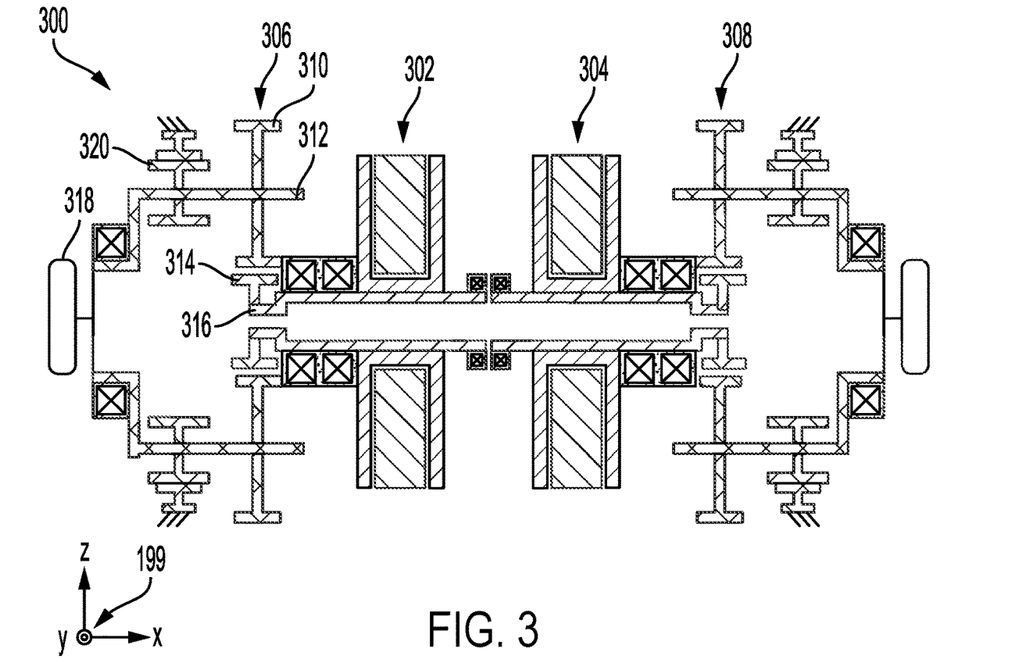
FIG. 3 shows a second example architecture of an electric axle.
Figure 4:
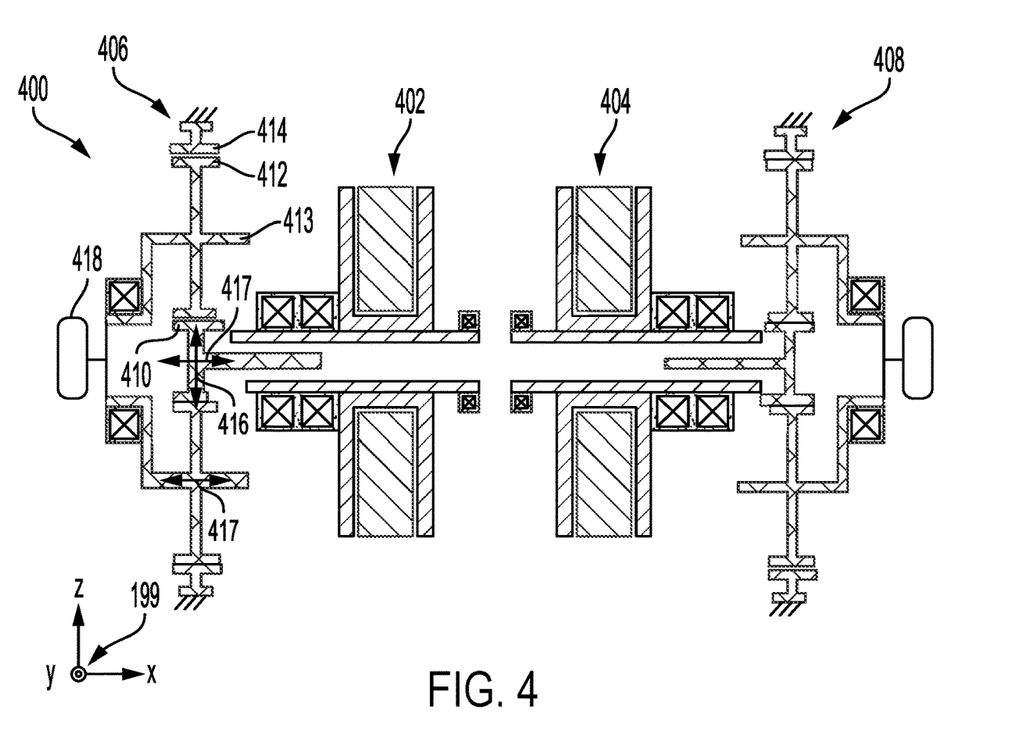
FIG. 4 shows a third example architecture of an electric axle.
Figure 5A:
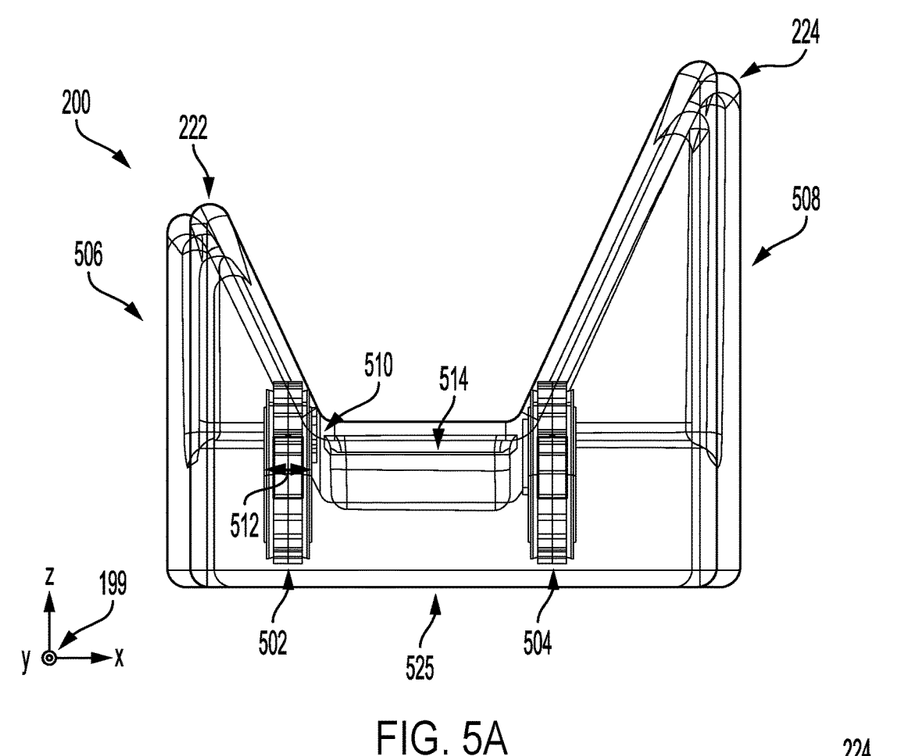
FIGS. 5A, 5B, and 5C show different views of a detailed illustration of a support structure example with electric machines of an electric axle incorporated therein.
Figure 5B:
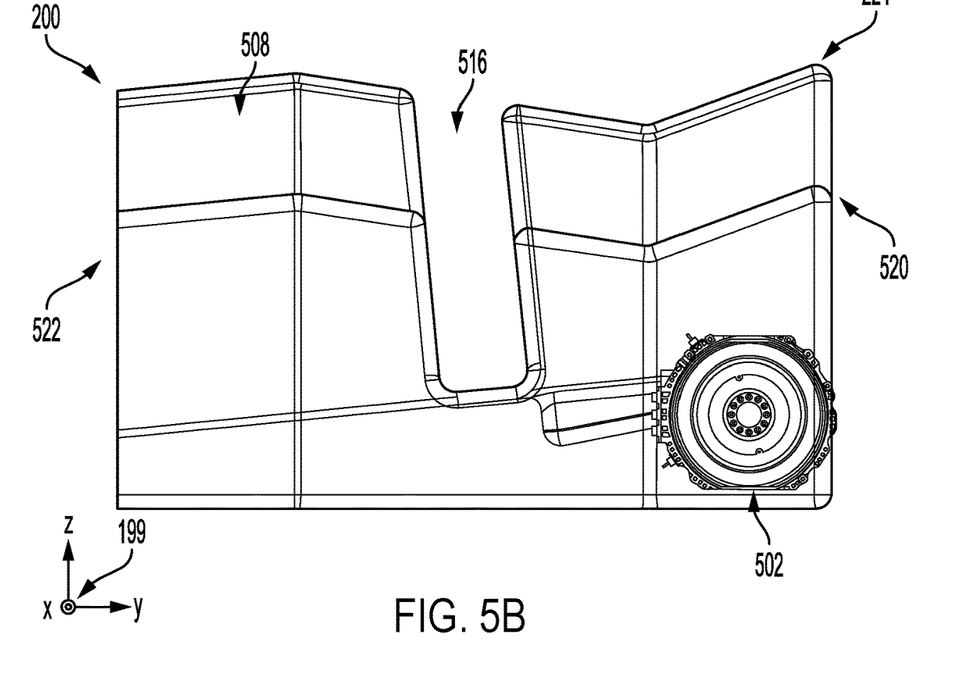
Figure 5C:
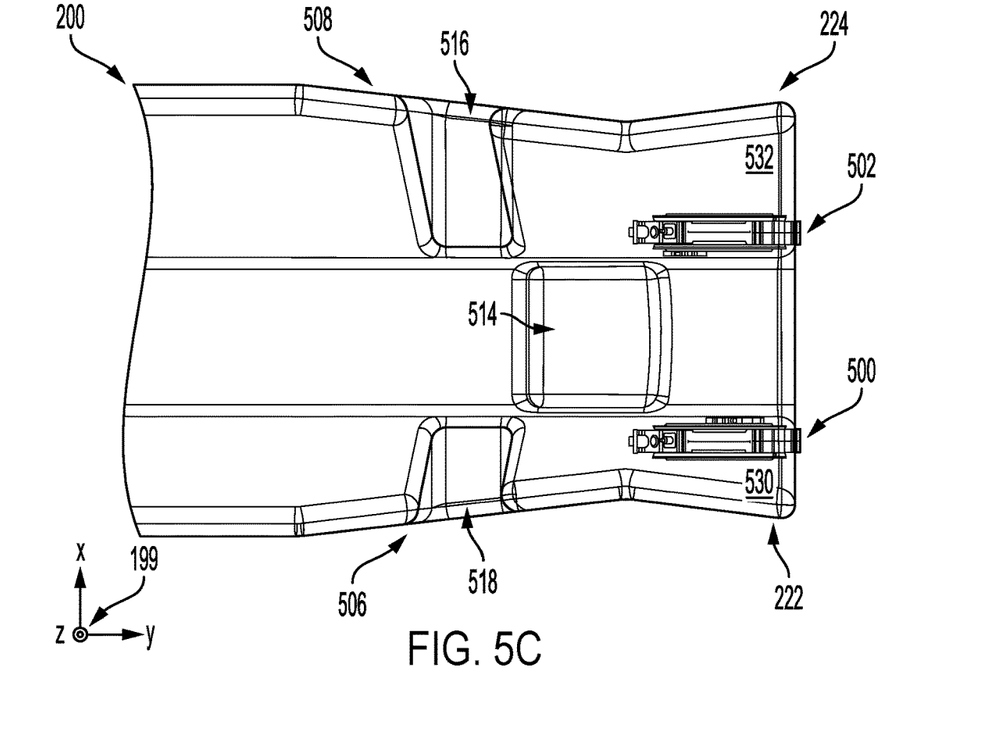

FIG. 1 shows a vehicle with a first example of an electric axle. FIG. 2 shows the first example of the electric axle incorporated into a support structure. FIGS. 3 and 4 show different examples of electric axle architectures that includes pairs of electric machines and associated gearboxes. FIGS. 5A, 5B, and 5C show different views of a detailed illustration of a support structure with electric machines of an electric axle incorporated therein. FIGS. 5A, 5B, and 5C are drawn approximately to scale, in the illustrated embodiment.

However, at least a portion of the illustrated components may have other relative dimensions, in other embodiments.

FIG. 1 shows a schematic depiction of a vehicle 100 having a powertrain 102 with an electric axle 104. The stick diagram of FIG. 1 provides a topology of the vehicle, powertrain, electric axle, and corresponding components.

As described herein an electric axle is an electric drive incorporated into an axle. The electric axle may be an electric beam axle, in one example. A beam axle may be an axle with mechanical components structurally supporting one another and extending between drive wheels. For instance, the beam axle may be a structurally continuous structure that spans the drive wheels on a lateral axis, in one embodiment. Thus, wheels coupled to the axle may move in unison when articulating, during, for example, vehicle travel on uneven road surfaces. The beam axle may be coupled to a dependent suspension system 105, in one example. The dependent suspension system may include shocks, dampers, and the like that are coupled to the beam axle. Therefore, the electric axle may be an unsprung mass. In such an example, the camber angle of the wheels may remain substantially constant as the suspension moves through its travel.

The electric axle 104 includes a first electric machine 106 and a second electric machine 108. As illustrated, each of the electric machines may specifically be designed as axial flux electric motor-generators due to their decreased axial length and efficiency gains when compared to radial flux motors. Further, each of the electric machines may have a similar electromagnetic component design and sizing to increase manufacturing efficiency. However, other types of electric machines may be used in alternate examples, such as transverse flux motors or radial flux motors. However, when radial flux motors are utilized, the axle's axial length may be increased. Further, in certain examples, electric machines with different configurations may be utilized in the electric axle. The electric machines 106 and 108 are designed to independently rotate with regard to one another. In other words, the rotor shafts of the electric machines are not coupled to one another. In this way, the tractive performance of the electric axle can be increased, if desired.

In the illustrated axial flux electric motor example, the motors each include a stator 110 and one or more rotor sections 112 that are positioned in different axial locations along the motor's axis of rotation 114. The rotor sections 112 are included in rotors 113 of the respective electric machine. Specifically, in one example, rotors sections of the axial flux motor may be positioned on opposing axial sides of the stator, thereby axially capturing the stator.

The electric axle 104 further includes a first gearbox 116 coupled (e.g., directly coupled) to the first electric machine 106. As described herein with regard to rotating components, coupling two components denotes that rotational energy and mechanical power is able to pass between these components. The first gearbox 116 is illustrated as a planetary gear set. Therefore, in the illustrated example, the first planetary gear set 116 includes a sun gear 118 that meshes with a first set of planet gears 117 which are rotationally coupled to a carrier 120 such that they are able to independently rotate thereon. To enable the rotation between the planet gears 117 and the carrier 120 as well as the other planet gears and carriers described herein, bearings (e.g., needle roller bearings) may be positioned on the carrier. These bearings are designed to support and permit rotation of the corresponding planet gears. As such, the bearings may include races, roller elements (e.g., needle rollers, cylindrical rollers, tapered cylindrical rollers, or balls), and the like. The sun gear 118 may be coupled to the rotor 113 (e.g., a rotor shaft 119) of the first electric machine 106. The first planetary gear set 116 further includes a second set of planet gears 122 rotationally coupled to the carrier 120. The first planetary gear set 116 further includes a ring gear 124 that meshes with the second set of planet gears 122. The carrier 120 may be coupled (e.g., directly coupled) to one or more drive wheels 123. The ring gear 124 may be grounded via a stationary component 126 such as an electric axle housing, for instance. In this way, the gearbox may achieve a desired gear ratio (e.g., gear reduction ratio). The electric axle housing is expanded upon herein. The other grounded components in the gearboxes shown in FIG. 1 as well as FIGS. 3 and 4 may be grounded via the axle housing, in one example.

In the illustrated example, the second set of planet gears 122 is positioned axially between the electric machine 106 and the first set of planet gears 117. In this way, the electric axle's lateral compactness is increased. However, other arrangements of the sets of planet gears have been contemplated which are expanded upon herein with regard to FIG. 3.

The electric axle 104 depicted in FIG. 1 further includes a second gearbox 128 coupled (e.g., directly coupled) to the second electric machine 108. As illustrated, the second gearbox 128 may have a component configuration that is substantially identical to the first gearbox 116 but has a mirrored layout. As such, the second gearbox 128 may be designed as a planetary gear set with a sun gear 130, a first set of planet gears 132, a second set of planet gears 134, a carrier 136, and a ring gear 138. The carrier 136 may be coupled (e.g., directly coupled) to one or more drive wheels 137 and the sun gear 130 may be coupled (e.g., directly coupled) to the rotor shaft 143. Redundant description of these gearbox components is omitted for concision.

Further, the first and second gearboxes 116 and 128 may not have clutches positioned therein and coupled thereto to decrease electric axle complexity. However, in other examples, the gearboxes may each include one or more clutches to enable the gearbox's ratio to be altered to increase motor efficiency, which may however increase the axle's size, complexity, and likelihood of component degradation.

Due to the compact configuration of the electric machines 106 and 108 which may be achieved via the axial flux design, the second set of planet gears 122, 134 and the ring gears 124, 138 may be positioned radially outward from the rotor shafts 119 and 143, respectively and axially between the first set of planet gears 117, 132 and the electric machines 106 and 108, respectively.

Bearings 140 may be coupled to inner axial sides 142 the rotor shafts 119 and 143 of the first electric machine 106 and the second electric machine 108, respectively. Sets of bearings 144 may be coupled to the outer axial sides 146 of the rotor shafts 119 and 143. Further, bearings 148 may be coupled to the carriers 120, 136. The aforementioned bearings as well as the other bearings described herein may include components such as inner races, outer races, roller elements (e.g., balls, needle rollers, cylindrical rollers, tapered cylindrical rollers, and the like). It will be appreciated that the size and/or construction of the bearings may be selected based on expected rotational speeds of the components to which they are attached, packaging constraints, and the like. As such, the size and/or configuration of at least a portion of the bearings may vary, in some cases. However, at least a portion of the bearings may have similar sizes and/or constructions.

The first and second gearboxes 116 and 128 are illustrated as single speed gearboxes that may enable the electric axle to achieve desired packaging demands of a support structure 200, shown in FIG. 2 and described in greater detail herein. However, in other examples, the gearboxes may be multi-speed gearboxes that includes one or more clutches, as previously indicated.

As illustrated in FIG. 1, the first electric machine 106 and the second electric machine 108 may be electrically coupled to inverters 150 and 152, respectively. These inverters are designed to covert direct current (DC) electric power to alternating current (AC) electric power and vice versa. As such, the electric machines 106 and 108 may be AC electric machines, in one example. However, in other examples, the electric machine may be DC electric machines and the inverters may therefore be omitted from the powertrain, in such an example. The inverters 150 and 152 may receive electric energy from one or more energy storage device(s) (e.g., traction batteries, capacitors, combinations thereof, and the like). Arrows 154 signify the electric energy transfer between the electric machines 106 and 108, the inverters 150 and 152, and the energy storage device(s) 156 that may occur during different modes of system operation. As such, during a drive mode electric energy may flow from the energy storage device(s) 156 to the electric machines 106 and 108 and during a regenerative mode, electric energy may flow in the opposite direction from the electric machines to the energy storage devices.

The vehicle 100 may also include a control system 180 with a controller 182. The controller 182 includes a processor 184 and memory 186. The memory 186 may hold instructions stored therein that when executed by the processor cause the controller 182 to perform the various methods, control techniques, and the like, described herein. The processor 184 may include a microprocessor unit and/or other types of circuits. The memory 186 may include known data storage mediums such as random access memory, read only memory, keep alive memory, combinations thereof, and the like.

The controller 182 may receive various signals from sensors 188 positioned in different locations in the vehicle 100, the powertrain 102, and the electric axle 104. The sensors may include electric machine speed sensors, energy storage device temperature sensor(s), an energy storage device state of charge sensor(s), wheel speed sensors, and the like. The controller 182 may also send control signals to various actuators 190 coupled at different locations in the vehicle 100, the powertrain 102, and the electric axle 104. For instance, the controller 182 may send signals to the inverters 150, 152 to adjust the rotational speed of the electric machines 106 and 108. In response to receiving the control commands, the other controllable components in the vehicle and powertrain may function in a similar manner with regard to command signals and actuator adjustment.

The vehicle 100 may also include one or more input device(s) 192 (e.g., an accelerator pedal, a brake pedal, a console instrument panel, touch interface, touch panel, keyboard, combinations thereof, and the like). The input device(s) 192, responsive to driver input, may generate an acceleration adjustment request.

An axis system 199 is provided in FIG. 1, as well as FIGS. 2, 3, 4, 5A, 5B, and 5C, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Rotational axes 114 of the electric machines 106 and 108 and rotational axes 194 the gearboxes 116 and 128 are further provided for reference, respectively.

FIG. 2 shows the electric axle 104, depicted into FIG. 1, incorporated into the support structure 200 (e.g., an axle support structure). The support structure 200 may be designed for use in a variety of powertrain configurations. For instance, the support structure 200 may be used in a hybrid powertrain where the electric axle 104, an internal combustion engine 202, and transmission 204 mate with the support structure. In such an example, the internal combustion engine 202 may be a transversely arranged. Thus, the engine's crankshaft may be parallel to the rotational axis of the electric axle 104. In such an embodiment, the engine and transmission may create a number of packaging constraints for the electric axle. The electric axle 104 with the above-mentioned structural characteristics facilitates efficient incorporation into the support structure 200. For instance, the use of the axial flux motor-generators enables the axial length of the axle to be reduced when compared to radial flux motors. As such, the electric axle 104 can be incorporated into the support structure 200.

The electric axle 104 further includes a housing 206 with a first section 208 that encloses the first electric machine 106 and the first planetary gear set 116 and a second section 210 that encloses the second electric machine 108 and the second planetary gear set 128. Still further the housing 206 includes a mid-section 212, that may have a reduced diameter 214 in comparison to the first and second sections 208, 210. As such, the mid-section may be referred to as a reduced diameter section. The housing 206 may be symmetric, with regard to an axis 215 (e.g., a vertical axis). In this way, the electric axle may have a desired mass balance. To form the housing trunnions, bolted flanges, welds, combinations thereof, and the like may be used to secure housing sections to one another. The reduced diameter section of the electric axle housing 206 allows the electric axle to be space efficiently packaged in a lower section of the support structure 200.

The electric axle 104, depicted in FIG. 1, is positioned in an axle recess 218. The axle recess 218 may be positioned at a longitudinal side 220 (e.g., a front side) of the support structure 200. Further, the electric axle 104 may laterally span the support structure 200. The support structure 200 is shown including a first vertically extending protrusion 222 and a second vertically extending protrusion 224. The first section 208 of the housing 206 may be positioned at least partially vertically below and/or incorporated into the first vertically extending protrusion 222. The second section 210 of the housing 206 may likewise be positioned at least partially vertically below and/or incorporated into the second vertically extending protrusion 224. Further, the mid-section 212 (e.g., decreased diameter section) of the housing 206 may be positioned in a location that is laterally between the first vertically extending protrusion 222 and the second vertically extending protrusion 224.

In one example, the first vertically extending protrusion 222 and the second vertically extending protrusion 224 may have varying vertical heights. As such, the support structure 200 may have lateral asymmetry with regard to these protrusions. The first and second vertically extending protrusions 222 and 224 may taper in a vertical direction. The support structure 200 may further be designed to wrap around or otherwise mate with powertrain components such as an engine and transmission, in the hybrid electric drive embodiment. As such, the support structure may be a cradle. To elaborate, a section (e.g., lubricant pan) of an internal combustion engine (e.g., transversally mounted engine) may mate with an engine recess 514, shown in FIG. 5B, in the support structure 200.

It will also be appreciated, that the support structure 200 may be an unsprung mass in the vehicle, with regard to a suspension system. As such, the support structure 200 may not be supported by suspension components such as springs and dampers, although it may have springs and dampers coupled thereto when installed in a vehicle with a suspension system.

FIGS. 3 and 4 show a second example of an electric axle 300 and a third example of an electric axle 400. Specifically, the planetary gear sets in these electric axle arrangements has been altered with regard to the electric axle electric axles 300, 400. However, the electric machines 302, 304, 402, and 404 shown in FIGS. 3 and 4 may have a similar design with regard to structure and/or function as the electric machines 106 and 108, described above with regard to FIGS. 1 and 2. Therefore redundant description of the electric machines is omitted for concision.

FIG. 3 specifically illustrates a first planetary gear set 306 and a second planetary gear set 308. As illustrated, these planetary gear sets have a similar construction and a mirrored layout. As such, redundant description of the gear set components in the second gearbox is omitted.

The first planetary gear set 306 again includes a first set of planet gears 310 that are rotationally coupled to a carrier 312 which meshes with a sun gear 314. Again, the sun gear 314 is coupled (e.g., directly coupled) to a rotor shaft 316 of the electric machine 302. Further, the carrier 312 may be coupled (e.g., directly coupled) to a drive wheel 318.

A second set of planet gears 320 is further rotationally coupled to the carrier 312. The first set of planet gears 310 is positioned axially between the second set of planet gears 320 and the first electric machine 302. Positioning the planet gears in this manner may enable the outer sections of the housing to be tapered, if wanted, thereby increasing the housing's space efficiency.

FIG. 4 again shows a first planetary gear set 406 and a second planetary gear set 408 that have a similar construction and a mirrored layout. As shown, the first planetary gear set 406 has a sun gear 410, planet gears 412 rotationally coupled to a carrier 413, and a ring gear 414 that are arranged along a similar axis 416 that is perpendicular to their axes 417 of rotation. In this way, the axle's axial length may be decreased to a greater extent than the previously described multi-stage planetary gear sets. However, using simple planetary gear sets may constrain the range of available gear ratios. Again, the carrier 413 of the first planetary gear set 406 is coupled to a drive wheel 418.

FIG. 5A shows the support structure 200 with a first electric machine 502 and a second electric machine 504 incorporated therein. It will be understood, that the first electric machine 502 and the second electric machine 504 may be incorporated into the electric axle 104, depicted in FIG. 2, and therefore serve as examples of the first electric machine 106 and the second electric machine 108, shown in FIG. 2.

The first vertical protrusion 222 and the second vertical protrusion 224 are again depicted. These protrusions are positioned on laterally sides 506 and 508 of the support structure 200. In the illustrated example, the first electric machine 502 and the second electric machine 504 are positioned within a recess 510 in the support structure 200. Sections of this recess 510 are positioned within as well as vertically below the vertically extending protrusions 222, 224. A bottom side 525 of the support structure 200 is further illustrated in FIG. 5B.

The electric machines 502 and 504 are illustrated as axial flux motors which have comparatively shorter widths 512 (as measured along their axes of rotation) when compared to radial flux motors. The radial flux motor design therefore enables the motors to be packaged in a lower portion of the support structure without undue modification. Consequently, the electric axle may pose less space constraints on surrounding components that may include, but are not limited to, powertrain components (e.g., hybrid powertrain components such as an engine and/or a transmission), suspension system components, and the like.

The electric machines 502, 502 may further be positioned on laterally opposing sides of an engine recess 514 which may be profiled to mate with at least a portion of an internal combustion engine such as a lubricant pan, in one specific example. Consequently, the axle assembly is able to achieve greater packaging efficiency, if so desired.

FIG. 5B shows the lateral side 506 of the support structure 200. A slot 516 may extend vertically down the lateral side 506. It will be understood that another slot 518, shown in FIG. 5C may extend vertically down the opposing lateral side 506, 508 of the support structure 200. The vertically extending protrusion 224 is shown positioned in front of the slot 516 with regard to an axis that is parallel to the y-axis. Further, the electric machine 502 is shown positioned at least partially vertically below the vertically extending protrusion 224. FIG. 5B further shows a front side 520 and a rear side 522 of the support structure 200.

FIG. 5C shows a top view of the support structure 200. The slots 516 and 518 are again shown on opposing lateral sides 508, 506 of the support structure 200. The engine recess 514 is further illustrated in FIG. 5C. The engine recess 514 may be positioned longitudinally in front of the slots 516, 518 and longitudinally behind the electric machines 502 and 504 and more generally the electric axle in which they are incorporated.

FIG. 5C further shows the first and second vertically extending protrusions 222, 224. Inner surfaces 530, 532 of these protrusions 222, 224 may form a cradle structure that may wrap around and/or mate with other powertrain components (e.g., a lubricant pan, a transmission, and the like), as previously discussed.

The electric axles and associated vehicle and more specifically powertrain systems, components, and the like may provide for an operating method of an electric axle that includes operating a first axial flux electric motor-generator and a second axial flux motor-generator based on an acceleration request, where the electric axle includes the first and second axial flux motor-generators directly coupled to a corresponding planetary gearbox.

The technical effect of the electric drive axle and operating method described herein is to achieve a space efficient axle package with desired performance characteristics which can be incorporated into a support structure that may be designed for use both full-electric vehicle platforms and hybrid electric vehicle platforms.

FIGS. 1, 2, 3, 4, 5A, 5B, and 5C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric axle is provided that comprises a first electric machine directly coupled to a first planetary gear set; a second electric machine directly coupled to a second planetary gear set; and a housing including: a first section that encloses the first electric machine and the first planetary gear set; a second section that encloses the second electric machine and the second planetary gear set; and a decreased diameter section extending between the first section and the second section.

In another aspect, an electric beam axle is provided that comprises a first axial flux motor-generator directly coupled to a first planetary gear set that is directly coupled to a drive wheel; and a second axial flux motor-generator directly coupled to a second planetary gear set that is directly coupled to a drive wheel.

In yet another aspect, an electric drive assembly is provided that comprises an electric beam axle comprising: a first electric machine directly coupled to a first planetary gear set; a second electric machine directly coupled to a second planetary gear set; and a housing including: a first section that encloses the first electric machine and the first planetary gear set; a second section that encloses the second electric machine and the second planetary gear set; and a decreased diameter section extending between the first section and the second section; and a support structure including an axle recess that at least partially encloses an electric beam axle.

In any of the aspects or combinations of the aspects, the support structure may include a first vertically extending protrusion and a second vertically extending protrusion and wherein the decreased diameter section of the housing is positioned laterally between the first and second vertically extending protrusions.

In any of the aspects or combinations of the aspects, the support structure may include an engine recess positioned longitudinally behind the axle recess.

In any of the aspects or combinations of the aspects, the first vertically extending protrusion and the second vertically extending protrusion may have varying heights.

In any of the aspects or combinations of the aspects, the electric drive assembly may be an unsprung mass.

In any of the aspects or combinations of the aspects, the electric axle may be a beam axle.

In any of the aspects or combinations of the aspects, in each of the first and second planetary gear sets a sun gear may be directly coupled to the respective electric machine and a carrier may be directly coupled to a drive wheel.

In any of the aspects or combinations of the aspects, the first and second planetary gear sets may each include planet gears axially offset from a sun gear.

In any of the aspects or combinations of the aspects, the first and second planetary gear sets may each include a ring gear that meshes with the planet gears and is mechanically grounded by the housing.

In any of the aspects or combinations of the aspects, the first and second planetary gear sets may be each simple planetary gear sets.

In any of the aspects or combinations of the aspects, the first planetary gear set and the second planetary gear set may each include a first set of planet gears and a second set of planet gears that is axially offset from the first set of planet gears.

In any of the aspects or combinations of the aspects, the first planetary gear set and the second planetary gear set may each include a sun gear coupled to their respective radial-flux motor-generator and a carrier coupled to a respective drive wheel.

In any of the aspects or combinations of the aspects, the housing may be profiled to mate with a first recess in a hybrid drive support structure and wherein the hybrid drive support structure may include a second recess sized to receive an internal combustion engine.

In any of the aspects or combinations of the aspects, the housing may be profiled to mate with a first recess in a hybrid drive support structure and wherein the hybrid drive support structure may include a second recess sized to mate with an internal combustion engine.

In any of the aspects or combinations of the aspects, the support structure may include an engine recess positioned longitudinally behind the axle recess and profiled to mate with a portion of an engine.

In any of the aspects or combinations of the aspects, the electric beam axle may include a housing that is profiled to mate with a first recess in a hybrid drive support structure and wherein the hybrid drive support structure includes a second recess sized to mate with an internal combustion engine.

In any of the aspects or combinations of the aspects, the first and second planetary gear sets may not have any clutches coupled thereto.

In any of the aspects or combinations of the aspects, the housing may be a symmetric about a vertical axis that extends through a reduced diameter section that is positioned laterally between a first section and a second section that at least partially enclose the first axial flux motor-generator and the second axial flux motor-generator, respectively.

In any of the aspects or combinations of the aspects, the housing may be symmetric about an axis that vertically extends through the decreased diameter section.

In another representation, a hybrid electric drive assembly is provided that includes an unsprung cradle with an electric beam axle incorporated therein, the electric beam axle comprising a pair of axial flux motors directly coupled to a pair of gearboxes that are directly coupled to drive wheels.

Note that the example control and estimation routines included herein can be used with various powertrain, transmission, and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of multiple processing strategies. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system (e.g., transmission control system), where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, these specific examples are not to be considered in a limiting sense, because numerous variations are possible. For example, the above technology can be applied to powertrains that include different types of propulsion sources including different types of electric machines and engines (e.g., internal combustion engines). The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle, comprising:
a first electric machine directly coupled to a first planetary gear set;
a second electric machine directly coupled to a second planetary gear set;
a support structure comprising a first vertically extending protrusion and a second vertically extending protrusion;
wheels positioned at extreme ends of the electric axle and outboard of the support structure; and
a housing including:
a first section that encloses the first electric machine and the first planetary gear set, wherein the first section is vertically below the first vertically extending protrusion of the support structure;
a second section that encloses the second electric machine and the second planetary gear set, wherein the second section is vertically below the second vertically extending protrusion of the support structure; and
a decreased diameter section that extends between the first section, the second section, the first vertically extending protrusion, and the second vertically extending protrusion.

2. The electric axle of claim 1, wherein the electric axle is a beam axle, and wherein the support structure comprises an engine recess profiled to mate with a portion of an engine.

3. The electric axle of claim 1, wherein in each of the first and second planetary gear sets a sun gear is directly coupled to the respective electric machine and a carrier is directly coupled to a drive wheel.

4. The electric axle of claim 1, wherein the first and second planetary gear sets each includes planet gears axially offset from a sun gear.

5. The electric axle of claim 4, wherein the first and second planetary gear sets each includes a ring gear that meshes with the planet gears and is mechanically grounded by the housing.

6. The electric axle of claim 1, wherein the first and second planetary gear sets are each simple planetary gear sets.

7. The electric axle of claim 1, wherein the first and second planetary gear sets do not have any clutches coupled thereto.

8. The electric axle of claim 1, wherein the first and second electric machines are axial flux motors, and wherein the support structure is a cradle shaped to wrap around and mate with powertrain components.

9. The electric axle of claim 1, wherein the housing is symmetric about an axis that vertically extends through the decreased diameter section, and wherein the support structure comprises lateral asymmetry.

10. An electric drive assembly, comprising:
an electric beam axle comprising:
a first electric machine directly coupled to a first planetary gear set;
a second electric machine directly coupled to a second planetary gear set;
a housing including:
a first section that encloses the first electric machine and the first planetary gear set;
a second section that encloses the second electric machine and the second planetary gear set; and
a decreased diameter section extending between the first section and the second section; and
a support structure including an axle recess that at least partially encloses the electric beam axle, wherein the support structure includes a first vertically extending protrusion and a second vertically extending protrusion, wherein the decreased diameter section of the housing is positioned laterally between the first and second vertically extending protrusions, and wherein the support structure includes an engine recess positioned longitudinally behind the axle recess and profiled to mate with a portion of an engine.

11. The electric drive assembly of claim 10, wherein the first vertically extending protrusion and the second vertically extending protrusion have varying heights.

12. The electric drive assembly of claim 10, wherein the electric drive assembly is an unsprung mass.

13. An electric beam axle, comprising:
a first axial flux motor-generator directly coupled to a first planetary gear set that is directly coupled to a drive wheel; and
a second axial flux motor-generator directly coupled to a second planetary gear set that is directly coupled to another drive wheel;
wherein the first and second axial flux motor-generators independently rotate; and
a housing that is profiled to mate with a first recess in a hybrid drive support structure, wherein the hybrid drive support structure includes a second recess sized to mate with an internal combustion engine.

14. The electric beam axle of claim 13, wherein the first planetary gear set and the second planetary gear set each includes a first set of planet gears and a second set of planet gears that is axially offset from the first set of planet gears.

15. The electric beam axle of claim 14, wherein the second set of planet gears is position axially between the first set of planet gears and the corresponding axial flux motor-generator.

16. The electric beam axle of claim 13, wherein the first planetary gear set and the second planetary gear set each includes a sun gear coupled to their respective radial-flux motor-generator and a carrier coupled to a respective drive wheel.

17. The electric beam axle of claim 13, wherein the housing is symmetric about a vertical axis that extends through a reduced diameter section that is positioned laterally between a first section and a second section that at least partially enclose the first axial flux motor-generator and the second axial flux motor-generator, respectively.

* * * * *